United States Patent [19]
Ohno et al.

[11] Patent Number: 6,034,962
[45] Date of Patent: Mar. 7, 2000

[54] COMMUNICATION METHOD WITH ATTACHING IDENTIFIERS TO RECEIVE REQUEST AND TRANSMIT REQUEST

[75] Inventors: Ryuichi Ohno, Yokohama; Mitsuo Asai, Higashimurayama; Hirofumi Yamashita, Kawasaki; Yoshihiro Takiyasu, Kodaira, all of Japan

[73] Assignee: Hitachi, Ltd., Tokyo, Japan

[21] Appl. No.: 08/943,788

[22] Filed: Oct. 3, 1997

[30] Foreign Application Priority Data

Oct. 4, 1996 [JP] Japan .................................. 8-264076

[51] Int. Cl.[7] ...................................................... H04L 3/24
[52] U.S. Cl. ............................................................ 370/399
[58] Field of Search ...................................... 370/399, 389, 370/397, 398, 445, 447, 449, 451, 458, 461, 427, 352, 380, 517, 464, 465, 466, 216, 428, 413, 412; 340/825.5, 825.51, 825.52

[56] References Cited

U.S. PATENT DOCUMENTS 4,872,159 10/1989 Hemmady et al. ...................... 370/352
4,942,574 7/1990 Zelle ........................................ 370/400

FOREIGN PATENT DOCUMENTS 717532 6/1996 European Pat. Off. .

OTHER PUBLICATIONS

D. Comer: "Internet working with TCT/IP", Prentice–Hall International, Inc., 1988, pp. 129–151.

*Primary Examiner*—Dang Ton
*Attorney, Agent, or Firm*—Beall Law Offices

[57] ABSTRACT

In a method of increasing the network use efficiency of computer communication and reducing the limitation of byte stream in a transmit/receive request, a virtual circuit is established between protocol modules such as applications for providing the communication function between software to mate one transmit request with one receive request. By returning an acknowledgement in a unit of request, any vain acknowledgement can be avoided and even in the case of asynchronous transmission/reception, a request which is completed in transmission/reception can be ended immediately, thus permitting efficient data transfer. Even when the transmit request length and the receive request length differ from each other, reliable communication of a request having a smaller request length can be ensured between mating transmit and receive requests. Further, in the case of synchronous transmission/reception, by copying only the latter half of a transmission buffer and returning a virtual ACK to the transmitting side when reception of the former half ends, the acknowledgement need not be waited for, thus permitting efficient data transfer.

15 Claims, 8 Drawing Sheets

COMMUNICATION METHOD WITH ATTACHING IDENTIFIERS TO RECEIVE REQUEST AND TRANSMIT REQUEST

BACKGROUND OF THE INVENTION

The present invention relates to a method for communication among computers, and more particularly to a communication method suitable for a transport layer and a network layer in a protocol layered model prescribed by an OSI (Open Systems Inter-connection) reference model.

Various kinds of data including text data and video data are exchanged between computers via a network. In the communication between computers, a network having a relatively low rate of 10 Mbps or less has hitherto been used as a physical transmission path but recently, a network of a high rate of up to 100 Mbps to 1 Gbps has been put to use in, for example, ATM (Asynchronous Transfer Mode). With the increase in the rate of the physical transmission path accelerated as above, overhead for data copy and interruption handling incurred during a protocol processing on each computer causes a bottleneck in using up the bandwidth of the transmission path.

As a typical protocol for the transport stratum, the TCP (Transmission Control Protocol) is available. This protocol is specifically described in "Internetworking with TCP/IP" by D. Comer, Prentice-Hall International, Inc., 1988, pp.129–151. The TCP is a reliable connection oriented protocol in which sequence numbers are sequentially applied to individual byte units conveying on a virtual circuit established between two computers so that orderly and errorless reception of all transmitting data pieces should be warranted. In the TCP, data handed down from an upper layer during a request for transmission is once copied on a buffer in the TCP in preparation for re-transmission required in the event of the loss of a packet. The transmit request from the upper layer succeeds at the time that the copying finishes.

When the data length of the data handed with the transmit request is larger than a maximum transfer unit (MTU), the data is divided into a plurality of MTU packets and a timer is set packet by packet. When packets are received correctly, the receiving side returns to the transmitting side an acknowledgement (ACK) response including an offset position used to indicate how many bytes in the byte stream are all received correctly, and the transmitting side responds to the information in the ACK to release a corresponding portion of the transmission buffer in the TCP. Then, the receiving side holds the received data in a buffer in the TCP until a receive request from the upper layer is issued.

Figure 2:
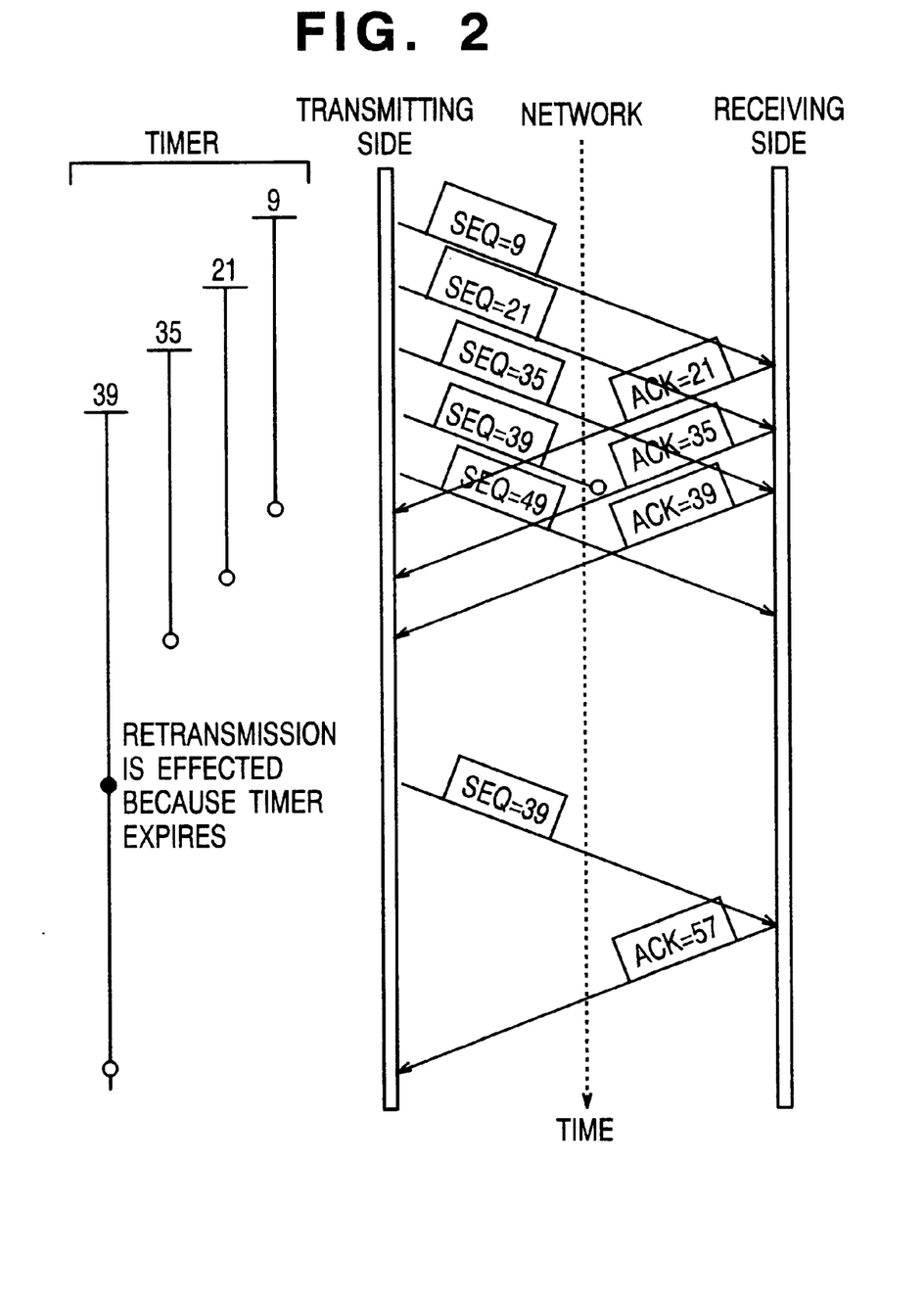
FIG. 2 is a diagram showing exchange of packets during transmission/reception in a conventional example (TCP)

Exchange of packets during transmission and reception in the TCP is illustrated in FIG. 2. When a computer 400 is a transmitting-side computer and a computer 460 is a receiving-side computer in FIG. 4, the transmitting side in FIG. 2 corresponds to an intermediate layer protocol module 404 and the receiving side in FIG. 2 similarly corresponds to an intermediate layer protocol module 464 in the receiving-side computer 460. Referring to FIG. 2, SEQ=9 indicates that data beginning with the 9-th byte is transferred from the transmitting side to the receiving side in a transmitting/receiving byte stream space which extends from the transmitting-side intermediate layer protocol module 404 to the receiving-side medium protocol 464 in FIG. 4, and ACK=21 corresponds to an acknowledgement response indicating that data as far as the 20-th byte has been received in the transmitting/receiving byte stream space. In FIG. 2, a data packet (SEQ=9) of 12 bytes corresponding to sequence numbers 9 to 20 is first transmitted from the transmitting side to the receiving side and concurrently therewith, the timer is set on the transmitting side in preparation for the loss of the packet. Upon receiving the data packet, the receiving side returns to the transmitting side the acknowledgement response (ACK=21) including information to the effect that the packet preceding the sequence number 21 has been received. Subsequently, data pieces corresponding to sequence numbers 21 to 34 and 35 to 38 are transmitted similarly and receipt acknowledgements are returned. In the event that data pieces corresponding to sequence numbers 39 to 48 are lost during a transmission, the data pieces succeeding the sequence number 39 are re-transmitted at the time that the timer set at the beginning of the transmission expires (time-out).

SUMMARY OF THE INVENTION

The above conventional method faces problems as below.

More particularly, in the TCP, data handed down from the upper layer during a transmit request is necessarily required to be once copied, giving rise to considerably large overhead when high-speed communication such as moving picture transfer is carried out. Thus, in an attempt to permit reliable communications by avoiding copying during transmission, a data buffer handed down from the upper layer must be held as it is in preparation for re-transmission in the event of the loss of the packet. This data buffer needs to be held in the transport layer until correct reception of all data pieces is acknowledged by response acknowledgements ACK. In this case, even with an ACK returned every packet as in the TCP, the buffer for transmission in the transport layer cannot be released and it is not until acknowledgements of correct receptions of all data pieces transferred during the transmit request are completed that the buffer for transmission can be rendered unnecessary. In other words, the acknowledgement ACK of each packet as in the TCP is done in vain.

Figure 3:
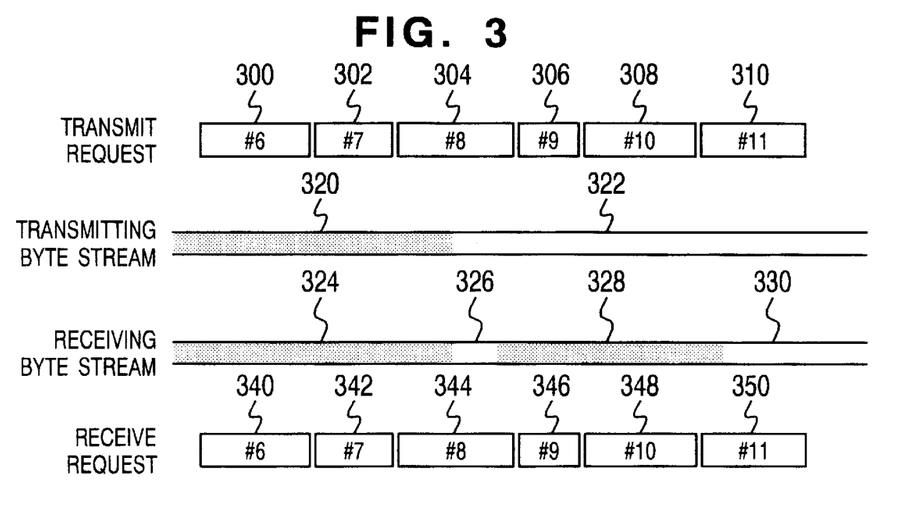
FIG. 3 is a diagram showing the relation between the transmit/receive request and the byte stream during asynchronous transmission/reception in the conventional example.

In the case where an asynchronous transmission without resort to copying during transmission is carried out in the manner of the TCP on the stream base, a transmit request preceding a position indicating bytes correctly received in the byte stream are deemed to succeed and finish, but a transmit request for data after the position and transferred at the time of that request cannot be finished even if the data is received correctly. Similarly, in the case of an asynchronous reception, it happens that a receive request cannot be finished even if all data pieces of a reception request are received correctly. FIG. 3 shows the relation between the transmit/receive request and the transmitting/receiving byte stream during an asynchronous transmission/reception. When the computer 400 is the transmitting-side computer and the computer 460 is the receiving-side computer in FIG. 4, the transmit request in FIG. 3 corresponds to each transmit request received by the intermediate layer protocol module 404 from an application or upper layer protocol module 402 and the receive request in FIG. 3 corresponds to each receive request received by the receiving-side intermediate layer protocol module 464 from an application or upper layer protocol module 462. The transmitting byte stream indicates a byte position occupied by transmitting data on a transmitting byte space when the data is transmitted from the intermediate layer protocol module 404 to a lower layer protocol module 406 and the receiving byte stream indicates a byte position occupied by receiving data on a receiving byte space when the data is received by the intermediate layer protocol module 464 from a lower layer protocol module 466. On the assumption that the transmission/reception of portions corresponding to 320 and 324 on the byte streams in FIG. 3 has already been completed, transmit requests #6 and #7 and receive requests #6 and #7 can be finished. If a portion corresponding to 326 on the byte stream is not yet received, then a transmit/receive request corresponding to 328 will not be finished in the case of the TCP even when the succeeding portion corresponding to 328 has already been received.

Further, in the TCP, received data must be held in the buffer in the TCP until a receive request is issued, and a very large buffer is needed in order to hold received data in high-speed communication such as moving picture transfer.

Further, since positioning of transmitting/receiving data pieces is effected in a unit of byte in the stream type protocol such as the TCP, even a shift of transmission/reception position of one byte is not allowed and an instance cannot be dealt with in which the length of a transmit request differs from that of a receive request, as exemplified by the case where for a request for a transmission of 20 bytes, only the initial 5 bytes are desired to be received or for a request for a transmission of any value of 10 to 30 bytes, reception is carried out with a request for a reception of 30 bytes.

Further, when a synchronous transmission is carried out without performing copying on the transmitting side, the next data cannot be transmitted before transmission of all data pieces during a transmit request is completed and an acknowledgement ACK is then returned.

As described above, the conventional method faces problems that high-speed highly efficient communication cannot be performed by reducing the use rate of the CPU when high-speed communication such as moving picture transfer is carried out and the byte position in transmission must be matched accurately with that in reception.

An object of the present invention is to provide a communication method which can permit high-speed highly efficient transmission/reception of data by reducing the use rate of the CPU even in high-speed communication such as moving picture transfer.

Another object of the present invention is to provide a communication method which can permit communications between a pair of transmission and receive requests having different request data lengths.

According to the present invention, in a communication method for use in a communication system in which a virtual circuit is established between a transmitting terminal and a receiving terminal, the transmitting terminal issues a transmit request to the virtual circuit and the receiving terminal issues a receive request to the virtual circuit, whereby data transfer is carried out through a network, and identifiers are attached to the receive request and the transmit request to mate the receive request with the transmit request.

In particular, the same identifier as that for a transmit request mating with a receive request is added to the receive request or conversely, the same identifier as that for a receive request mating with a transmit request is added to the transmit request.

In this manner, a transmit request and a receive request having the same identifier on the transmitting terminal side and receiving terminal side of the virtual circuit are paired and data is exchanged between the pair.

For example, the identifiers are assumed to be integer values which are initialized to the same value at both ends of a virtual circuit when the virtual circuit is established, the same value being incremented each time that a transmit request or a receive request takes place and returned to 0 when the resulting value exceeds "an upper limit which takes the same value at both ends of the connection". The integer values are called herein request numbers and used as identifiers, as will be described below.

The request number is applied to the transmit request and the receive request when the transmit request and the receive request are issued, and the request number is updated before or after the issue. Transmission/reception is performed between requests to which a transmit request number and a receive request number being equal to each other at both ends of a connection are applied. On the transmitting side, data transferred in accordance with a transmit request is divided into individual maximum transfer units (MTU) which in turn are transmitted. On the receiving side, a data structure is provided which indicates which portion of each reception request is received, data reception between paired requests having the same request number is decided as to whether to be finished by using the data structure, and an acknowledgement ACK is returned when the reception ends. In the case where copying is not carried out on the transmitting side, the buffer on the transmitting side cannot be released even when the ACK is returned in a unit of division and returning of the ACK is done in vain, but when the ACK is returned in a unit of request, the vain returning of the ACK can be prevented. In the case of asynchronous transmission/reception, a request for which transmission/reception finishes can be ended immediately regardless of the order by which the request is issued. By virtue of these features, the present communication method can permit high-speed highly efficient data transfer by reducing the use rate of the CPU.

In the case where before a receiving buffer is transferred by a receive request, data from the corresponding or mating transmit request arrives, the data is discarded but this transmit request number is set in the data structure owned by the receiving side and indicating up to which ordinal transmit requests have already been reached. At the time that actual execution of the receive request is subsequently effected, it is known from the data structure that the corresponding transmit request has already been carried out and hence data is immediately re-transmitted by returning a negative acknowledgement (NAK) to the transmitting side. In this manner, when the corresponding transmit request data arrives before the receive request is issued, that data is not held but is re-transmitted at the time that the receive request is actually effected subsequently, thereby ensuring that a large buffer need not be provided in the transport layer even in the high-speed communication such as moving picture transfer.

Further, a field indicative of a final packet in a request is provided in a transmitting packet and when a request data length of a transmit request is smaller than a request data length of the corresponding receive request, the end of the transmit request data is informed to the receiving side by using this field in order that reliable communication can be performed for data meeting the request data length of the transmit request. When the request data length of the transmit request is larger than the request data length of the corresponding receive request, reliable communication can be ensured for data meeting the receive request data length. In this case, a field for accommodating an actually received data length is provided in the ACK to enable the transmitting side to know from the field an actually transmitted data length. In this manner, even when the transmit request length and the receive request length differ from each other, reliable communication can be ensured for data corresponding to a smaller request length between the mating transmit request and receive request, so that for a transmit request of 20 bytes, only the initial 5 bytes can be received and for a transmit request of a value which takes any value of 10 to 30 bytes, reception can be performed with a receive request of 30 bytes.

In the case of synchronous transmission/reception, data at the latter half in the transmission buffer in the transmit request is copied and held on the buffer on the transmitting terminal. A field indicating that a virtual ACK request is effected is provided in a transmitting packet and this field is set when the final packet of a not-copying portion is transmitted. On the receiving side, if, upon receipt of the packet set with the field indicating that the virtual ACK request is effected, all packets preceding that packet have already been received, the virtual ACK will be returned. On the transmitting side, the next transmit request to the virtual circuit can be carried out upon receipt of the virtual ACK. Further, upon receipt of an ACK, the copy data holding buffer on the transmitting terminal is released.

In this manner, in the case of synchronous transmission/reception, by copying and holding data at the latter half in the transmission buffer in the transmit request on the buffer on the transmitting terminal, transmit requests can sequentially be issued without waiting for the ACK. Even if the size of a copying portion is made to be larger than the size corresponding to the round-trip time of a packet, the ACK waiting time cannot be reduced. Then, the size corresponding to the round-trip time is made to be equal to the size of the copying portion to take advantage of the fact that this size takes a value which does not depend on the transmission buffer size in the transmit request, thereby making it possible to suppress the ratio of the copying portion to a small value by enlarging the transmission buffer size. Accordingly, by the present communication method, high-speed highly efficient data transfer can be ensured by reducing the ratio of use of the CPU.

In this case, too, by inserting a data length designated in a receive request in the virtual ACK, reliable communication can be ensured for a smaller request length even when the transmit request length and the receive request length are different from each other between the corresponding transmit and receive requests.

DESCRIPTION OF THE PREFERRED EMBODIMENTS

Embodiments of the present invention will now be described in greater detail.

Firstly, a first embodiment will be described. An object of the first embodiment is to permit high-speed highly efficient data transmission/reception by reducing the rate of use of the CPU when copying is not performed on the transmitting side and to provide a method for communication between paired transmission and receive requests of different request data lengths.

Figure 1:
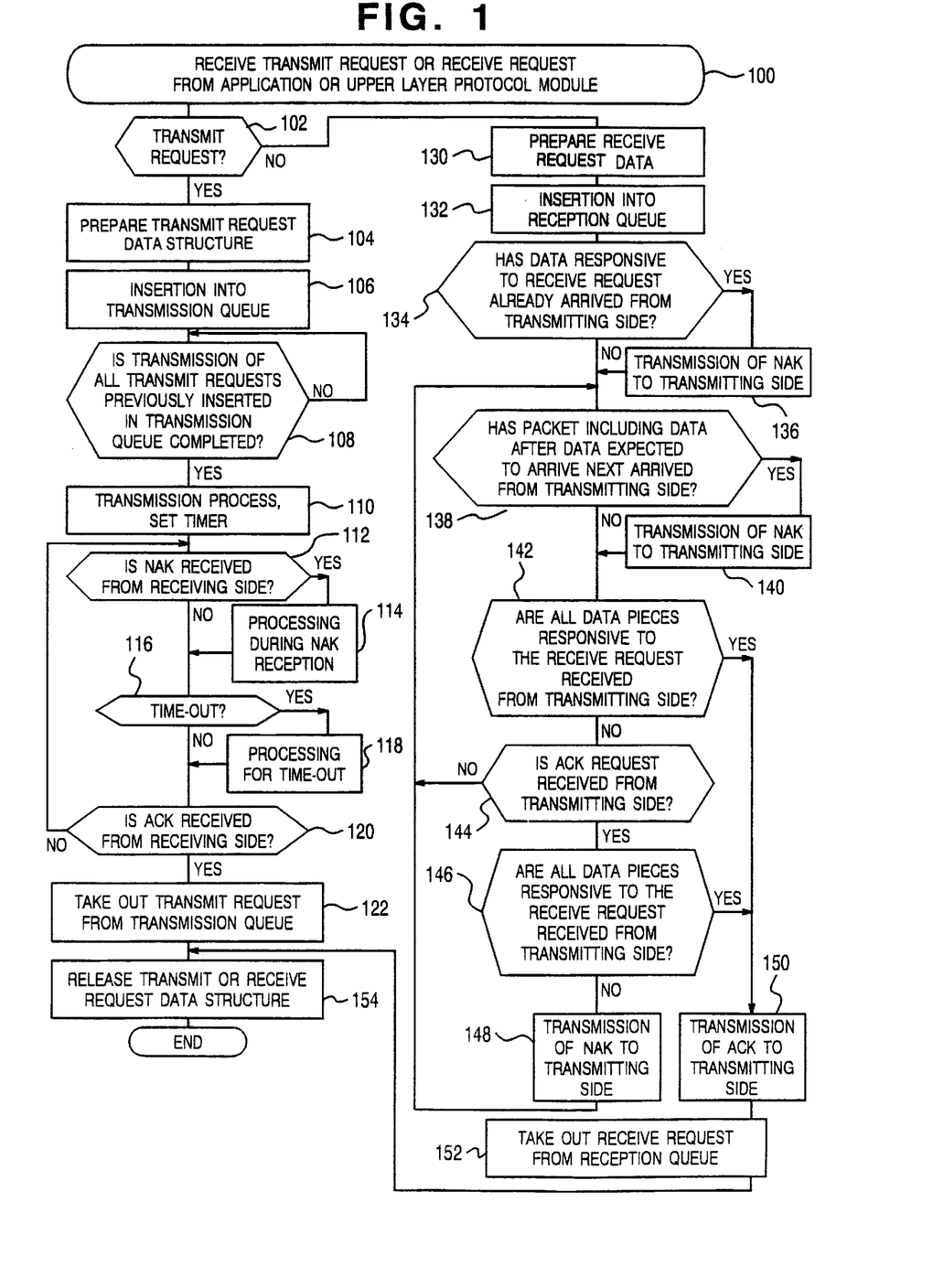
FIG. 1 is a flow chart showing the processing procedure of a first embodiment of the present invention.
Figure 4:
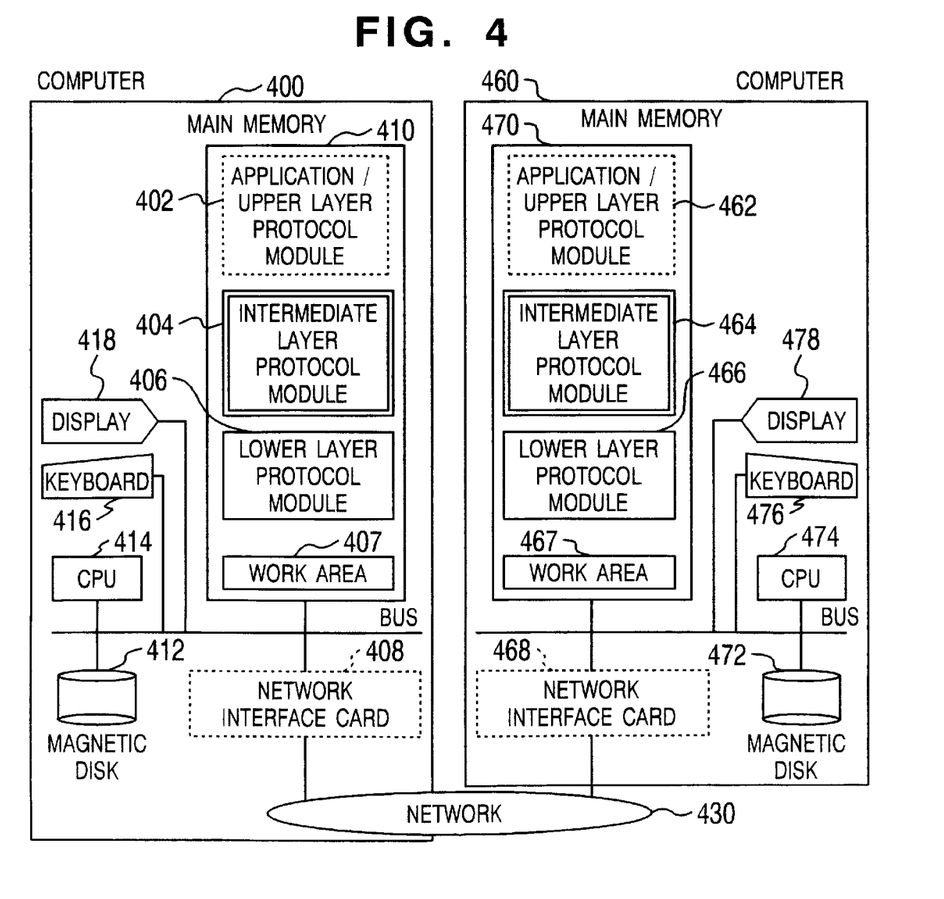
FIG. 4 is a block diagram of a system in the first embodiment of the present invention.

FIG. 1 is a flow chart showing the processing procedure according to the first embodiment and FIG. 4 is a block diagram showing a system configuration and a protocol module hierarchy according to the present invention. FIG. 8 is a block diagram of an intermediate layer protocol module in FIG. 4, and FIGS. 5, 6 and 7 show a data structure for storing transmit/receive requests in the intermediate layer protocol module, a data packet format and a receipt acknowledgement packet format, respectively.

In FIG. 4, the computers 400 and 460 are connected via a network 430. The network 430 includes connecting units such as an ATM switch and a router.

The computer 400 includes a display 418, a keyboard 416, a CPU 414, a magnetic disk 412, a network card 408 and a main memory 410. Similarly, the computer 460 includes a display 478, a keyboard 476, a CPU 474, a magnetic disk 472, a network card 468 and a main memory 470. The display 418, keyboard 416, magnetic disk 412, network card 408 and main memory 410 are accessed from the CPU 414 via buses and the display 478, keyboard 476, magnetic disk 472, network card 468 and main memory 470 are accessed from the CPU 474 via buses. The main memory 410 is loaded with the lower layer protocol module 406, the intermediate layer protocol module 404 and the application or higher protocol module 402, and used for a work area 407. Similarly, the main memory 470 is loaded with the lower layer protocol module 466, the intermediate layer protocol module 464 and the application or upper layer protocol module 462, and used for a work area 467.

Each of the network interface cards 408 and 468 corresponds to hardware for network interface such as an ATM card. But, part or all of the function corresponding to the network interface cards 408 and 468 may alternatively be attached to the computers 400 and 460 and provided in the network 430 instead of being provided in the computers 400 and 460. Further, in some applications, part of the function corresponding to the lower layer protocol modules 406 and 466 and intermediate layer protocol modules 404 and 464 may be realized in the form of hardware in the network interface cards 408 and 468.

The lower layer protocol modules 406 and 466 are protocol modules each corresponding mainly to a physical layer, a data link layer and a network layer in the protocol hierarchy prescribed by the OSI reference model, and provide the function of performing data transmission between the two computers. When an identifier (IP address, MAC address and the like) of the computer or a connection such as ATM is established for the lower layer protocol module 406 or 466, the intermediate layer protocol module 404 or 464 designates a destination address of data or the like by designating the identifier (VPI/VCI number or the like) and in addition designates a storage location of transmitting/receiving data by designating a buffer for transmission/reception, a buffer length or the like.

The intermediate layer protocol modules 404 and 464 are protocol modules each corresponding mainly to a transport layer and a network layer in the protocol hierarchy prescribed by the OSI reference model, and provides the function of performing communication between the software modules such as applications on the two computers by utilizing the function of the lower layer protocol modules 406 and 466. The application or upper layer protocol module 402 or 462 establishes connection of a virtual circuit and designates a destination of data by designating to the intermediate layer protocol module 404 or 464 an identifier of a receiving-side computer and an identifier for identifying a receiving partner on the receiving-side computer (port numbers in the TCP and UDP) or a connection identifier obtained when a connection is established on the basis of the above identifiers. The application or upper layer protocol module 402 or 462 further designates a storage location of transmitting/receiving data by designating the buffer for transmission/reception and the buffer length.

The application or upper layer protocol modules 402 and 462 are host modules of the intermediate layer protocol modules 404 and 464.

The work areas 407 and 467 are memory areas used for exchange of data between modules.

Figure 5:
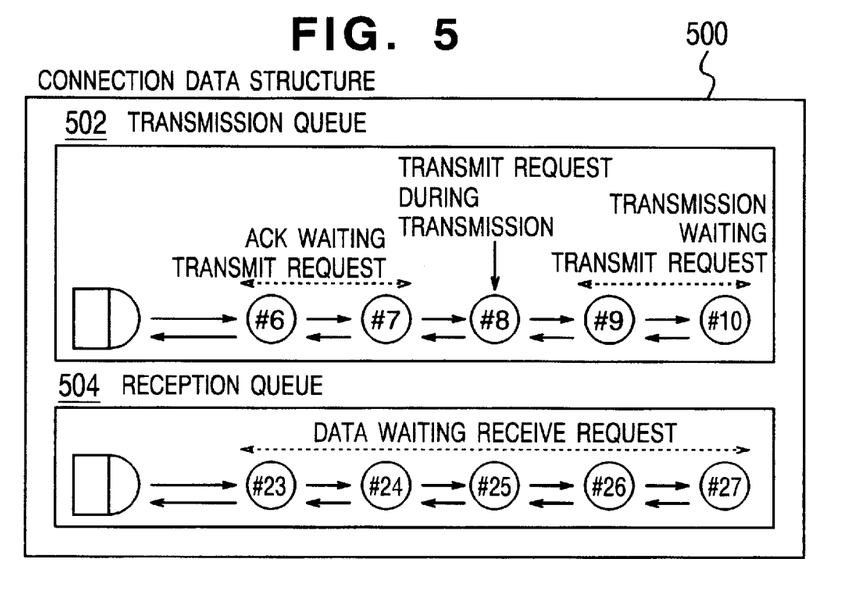
FIG. 5 is a diagram showing a data structure for storing transmit/receive requests in the first embodiment of the present invention.

Referring to FIG. 5, a connection data structure 500 exists in each of the intermediate layer protocol modules 404 and 464. The connection data structure 500 is a data structure assigned to each connection when the virtual circuit is established. A transmission queue 502 is a queue for storing a data structure used when a transmit request is issued from the application or upper layer protocol module 402 or 462, and a receiving queue 504 is a queue for storing a data structure used when a receive request is issued from the application or upper layer protocol module 402 or 462. The transmit request data structure consists of a transmit request number, a transmit request data length and a buffer for transmit request, and the receive request data structure consists of a receive request number, a receive request data length, a buffer for receive request and a list indicating a data portion actually received in the buffer for receive request. Of transmit requests in the transmission queue 502, an Ack waiting transmit request is a transmit request of an acknowledgement response waiting state succeeding a transmission which has already been completed, and a transmit request during transmission indicates a transmit request which is being transmitted presently. Further, a transmission waiting transmit request indicates a transmit request which is not yet transmitted and is placed in a transmission waiting state. All receive requests in the reception queue 504 indicate requests for receptions which have been made but have not been completed yet.

Figure 6:
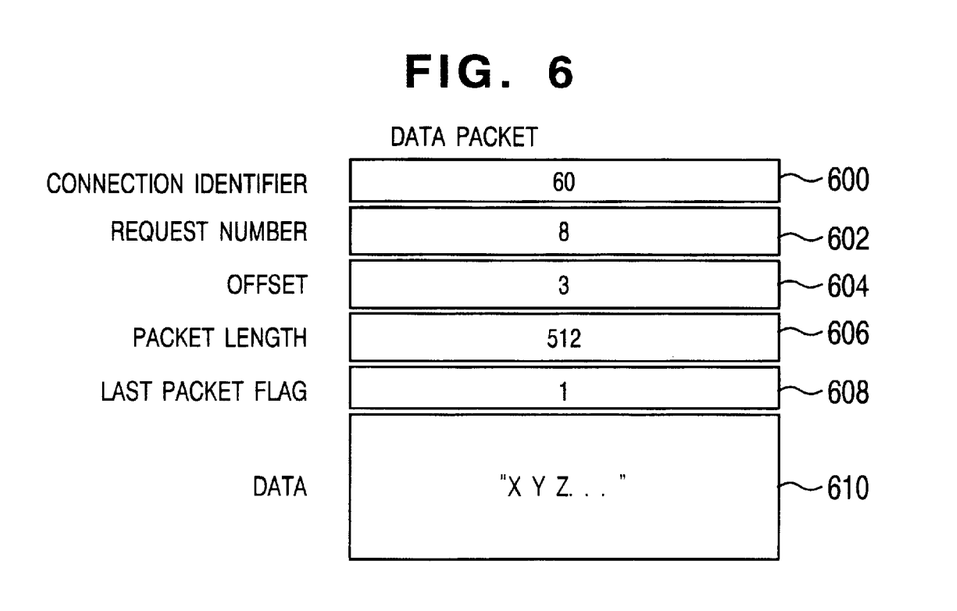
FIG. 6 is a diagram showing a data packet format in the first embodiment of the present invention.

FIG. 6 shows a format of a data packet transferred between the intermediate layer protocol modules 404 and 464 in FIG. 4. A connection identifier 600 is an identifier which is assigned for identification of respective connections when connections are established in the intermediate layer protocol modules 404 and 464, and a request number 602 indicates which transmit request data structure the data packet belongs to. An offset 604 indicates which data position in a transmit request is included in the packet. The offset 604 can be designated in a unit of byte but when the maximum transfer unit (MTU) is precedently agreed at both ends of a connection, the transmit request is divided in a unit of MTU and therefore, the offset 604 may be designated by a division unit sequence number indicating which division unit in the transmit request is included in the packet. A packet length 606 indicates a length of the packet in a unit of byte. A last packet flag is a flag which is set when the data packet is a packet which includes the final data in the transmit request. When receiving a packet set with this flag, the receiving side can know the length of the transmit request and if the transmit request length is shorter than a requested length, then an ACK will be returned when data of the transmit request length is received, thus ending the receive request.

A concrete example of the data packet format shown in FIG. 6 will now be described. Like a port number in the TCP and UDP, a number such as 60 is assigned to the connection identifier 600. The request number 602 is a number specific to each request which is assigned when the transmit request is issued and for 16 bits, it takes a suitable value of 0 to 65535. For example, a value such as 8 is assigned. When using a division unit number, the offset 604 is the division unit number beginning with 0 in sequence and for example, 3. The packet length 606 is designated by a value of, for example, 512 bytes. The last packet flag 608 normally takes either 0 or 1.

Figure 7:
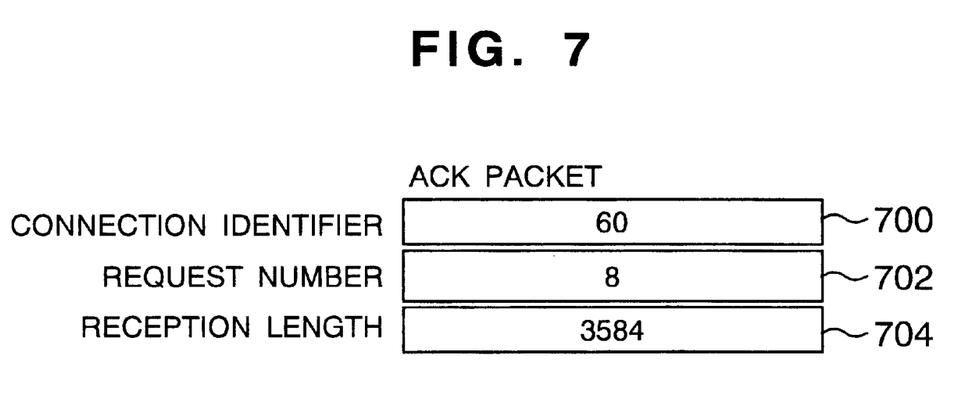
FIG. 7 is a diagram showing an acknowledgement response packet format in the first embodiment of the present invention.
Figure 8:
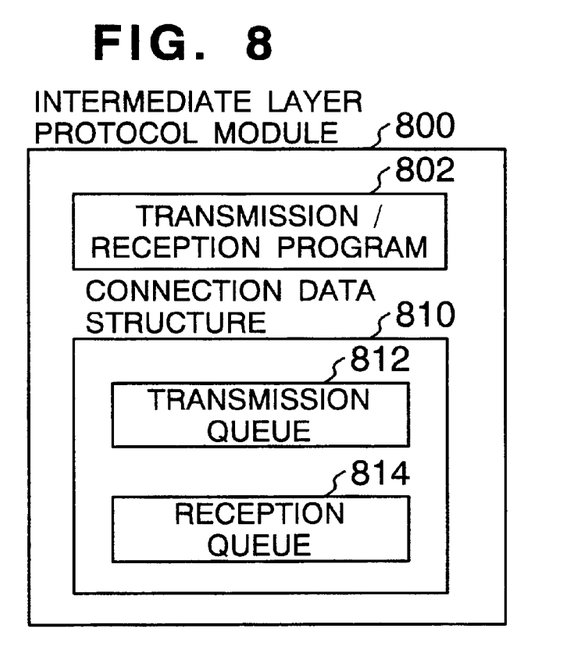
FIG. 8 is a diagram showing an intermediate layer protocol module in the first embodiment of the present invention.

FIG. 7 shows a format of a receipt acknowledgement packet transferred between the intermediate layer protocol modules 404 and 464 in FIG. 4. A connection identifier 700 is a data structure assigned to each connection when connections are established in the intermediate layer protocol modules 404 and 564, and a request number 702 indicates which transmit request the receipt acknowledgement packet or the acknowledgement response (ACK) responds to. A reception length 704 indicates a data length actually received by the receive request. Even when the receive request length is shorter than the transmit request length, the reception length 704 enables the transmitting side to notify the actually transmitted data length to the application or upper layer protocol modules 402 and 462 when the transmit request ends.

A concrete example of the receipt acknowledgement packet format of FIG. 7 will now be described. Like a port number in the TCP and UDP, the connection identifier 700 is assigned with a number such as 60. The request number 702 is a request number of paired transmission and receive requests whose reception is acknowledged by the receipt acknowledgement packet and assigned with a value, for example, 8. The reception length 704 is a data length actually received by the receive request and is assigned with a value, for example, 3584 bytes.

Next, the operation of essential parts of FIGS. 4, 5, 6 and 7 will be described on the basis of the flow chart of FIG. 1.

Firstly, when the application or upper layer protocol module 402 or 462 issues a transmit request or a receive request to the intermediate layer protocol module 404 or 464 (step 100), a transmit request data structure is prepared in the case of a transmit request (step 104) and inserted in the transmission queue 502 (step 106), but in the case of a receive request, a receive request data structure is prepared (step 130) and inserted in the reception queue 504 (step 132).

At that time, respective transmit requests are added with transmit request numbers and respective receive requests are added with receive request numbers. But the transmit request number and the receive request number are initialized to the same value at both ends of each connection when the connection is set up and the request numbers are incremented each time that the transmit request and the receive request take place so as to be assigned to these requests. In other words, a receive request number of a receive request issued at the first occurrence on one computer on the connection has the same value as a transmit request number of a transmit request issued at the first occurrence on the other computer, and identical values are similarly taken for transmit requests and receive requests issued at the second occurrence and the third occurrence on computers at both ends of the connection, so that a pair of transmission and receive requests which mate with each other on the connection can be determined and data can be exchanged between these requests. The request number is described as being incremented each time that individual transmission and receive requests are issued, but it may be incremented when the individual transmission and receive requests have been completed. Since the request number cannot be increased indefinitely, an upper limit of the request number is set and when the request number exceeds its upper limit, it is returned to 0. Of course, the upper limit must take the same value for the transmit and receive requests.

In the case of the transmit request, completion of transmission of all transmit requests precedently inserted in the transmission queue is waited for (step 108) and the transmission processing is carried out at the time that the transmission of all transmit requests precedently inserted in the transmission queue is completed and the timer is set (step 110). In the transmission processing, when data transferred during the transmit request is larger than the maximum transfer unit (MTU), the data is divided into a plurality of packets which in turn are transmitted. In the case where after the transmit request data is transmitted, an NAK packet for that transmit request is received (step 112), the processing during NAK reception (step 118) is carried out in which a part of the transmit request data which is requested to be re-transmitted by the NAK packet is re-transmitted (step 114). When a time-out occurs (step 116), the processing during time-out is carried out in which an ACK request packet is transmitted and the timer is set again (step 118). When the ACK packet for the transmit request is received (step 120), this transmit request is taken out of the transmission queue (step 122) and the completion of the transmit request is informed to the application or higher protocol modules 402 and 460. Also, a reception length actually received by the receiving-side computer at that time is concurrently informed.

In the case of the receive request, it is checked whether transmission data of the receive request has already arrived (step 134) and if the data has already been arrived, an NAK packet is transmitted to urge re-transmission (step 136). The received data packet is held at a suitable position of the buffer for receiving data in accordance with an offset of the packet header and a packet length. When the ATM in which any packet is not outrun on the network is used as the network 430, a packet arriving next can be predicted and so, if a packet having data after predicted data arrives, the predicted packet is considered to be lost (step 138). In such an event, re-transmission of the data at a portion considered to be lost can be requested by transmitting a NAK packet (step 140). When the data packet or the ACK request is received, the corresponding receive request is checked as to whether or not it has received all data pieces of a data length which is the smaller of the receive request length and the transmit request length informed by the transmitting side which sets the last packet flag (steps 142 and 146). When completion of the receive request can be confirmed by this checking, an ACK packet is transmitted to the transmitting side (step 150), the receive request is taken out of the reception queue (step 152), and the completion of the receive request is informed to the application or upper layer protocol modules 402 and 462. At that time, a reception length actually received by the receiving-side computer is also informed. If the receive request is not completed at the time of receipt of the ACK request, a NAK is transmitted to the transmitting side to inform it of an unreached data portion.

In this manner, by transmitting the ACK only when the completion of the receive request is confirmed, any vain ACK can be omitted.

When the transmit request or receive request is taken out of the transmission queue or reception queue, the corresponding data structure is released (step 154).

The flow of processing described above will further be explained by using a concrete example. In the present instance, the flow of processing will be shown by way of example of data transmission/reception between paired transmission and receive requests having a request number of 8.

Firstly, it is assumed that the transmitting side transmits data of 3584 bytes. With the maximum transfer unit (MTU) set to 1024 bytes, the data transferred during the transmit request is larger than the maximum transfer length and is therefore divided into four packets which in turn are sequentially transmitted. The data packet of FIG. 5 shows the fourth data packet transmitted at that time. Each of the first, second and third data packets has a packet length of 1024 bytes and a last packet flag set to 0. The fourth data packet is a final packet and hence, this final packet has a packet length of 512 bytes (which is the remainder of the packet length) and a last packet flag set to 1. The fields of connection identifier and request number take the same value for all of the four data packets. Because of the fourth packet, the offset is 3.

Next, it is assumed that the receiving side also performs a receive request having a receive request length of 3584 bytes. The data packet transmitted from the transmitting side identifies the receive request by the aid of the connection identifier being 60 in the data packet header and the request number being 8 on the connection, and the data is copied at a suitable position of the buffer for receiving data in the receive request in accordance with the offset and packet length. For example, the fourth data packet shown in FIG. 6 has the offset being 3 and is therefore copied on a position of 512 bytes from the 3072-nd byte on the buffer for receiving data. Upon completion of reception of all data pieces, a receipt acknowledgement packet is transmitted to the transmitting side. The receipt acknowledgement packet of FIG. 7 shows the receipt acknowledgement packet transmitted to the transmitting side at that time. The receiving side can end the processing at the time that all data pieces are received and the transmitting side can end the processing at the time that the receipt acknowledgement packet is received.

Advantageously, in the first embodiment, any vain ACK can be omitted in the case of copying on the transmitting side by performing transmission/reception control between the paired transmission and receive requests, and the transmit/receive request can be completed regardless of the order of requests during asynchronous transmission/reception, with the result that high-speed highly efficient data transmission/reception can be ensured by reducing the use rate of the CPU.

Further, between paired transmission and receive requests having different request data lengths, reliable transmission/reception can be warranted for a smaller request data length and therefore, for example, a transmit request whose data length is unknown in advance can be dealt with by making a receive request of relatively large data length.

Next, a second embodiment will be described. In addition to accomplishment of the object of the first embodiment, the second embodiment intends to permit high-speed highly efficient data transmission/reception by reducing the use rate of the CPU even in the case of synchronous transmission/reception.

Figure 9:
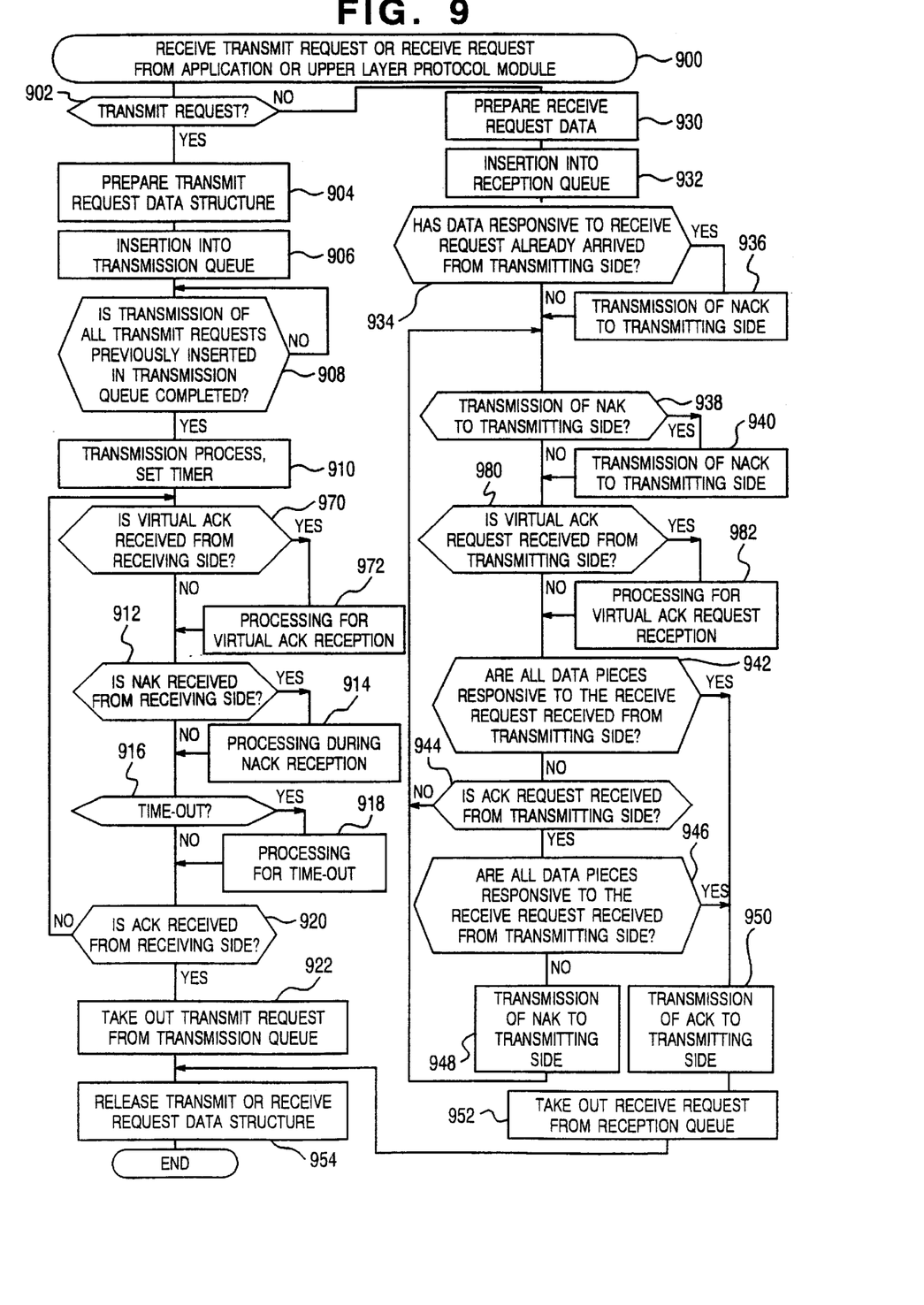
FIG. 9 is a flow chart showing the processing procedure of a second embodiment of the present invention.
Figure 10:
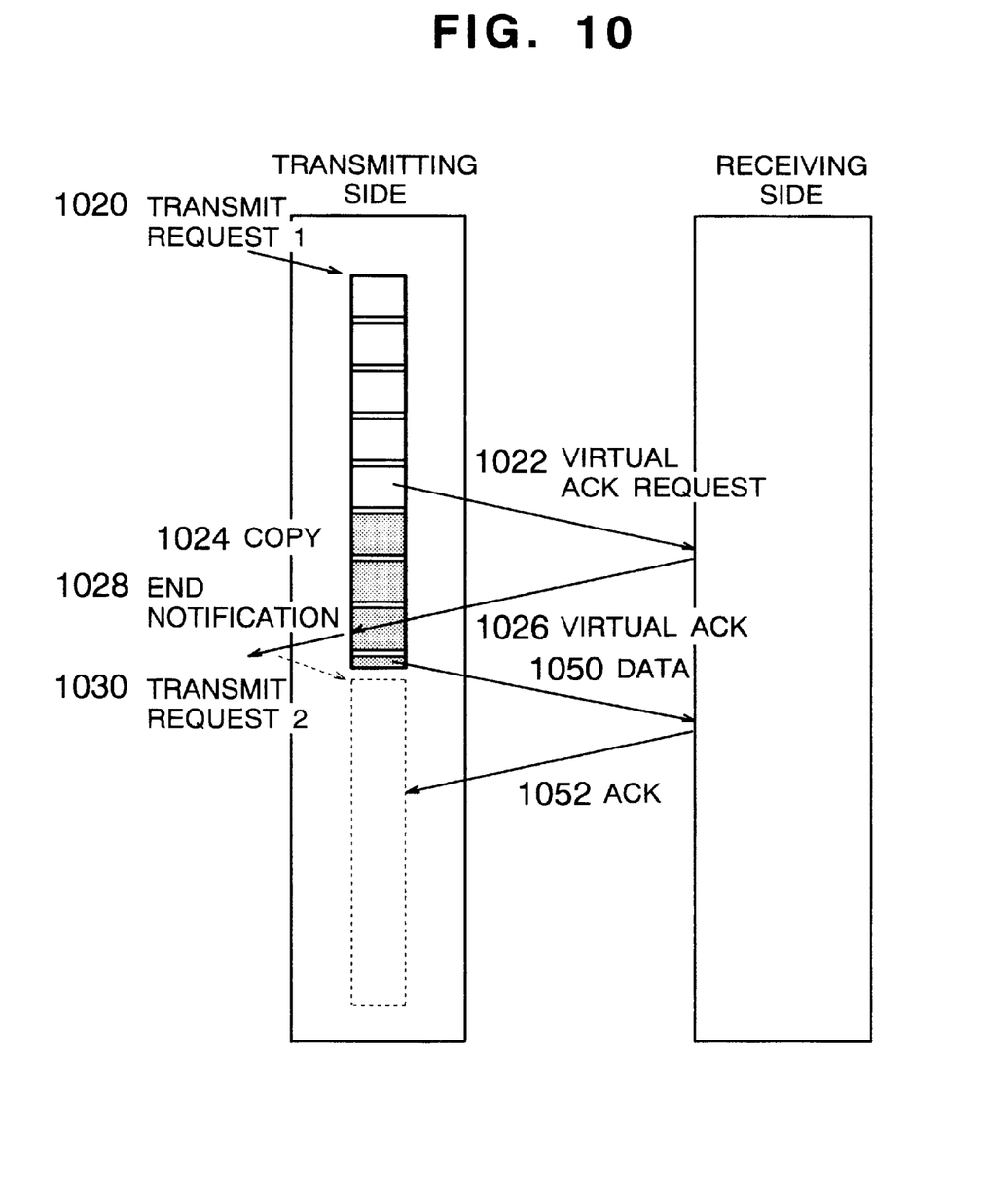
FIG. 10 is a diagram showing a flow of the processing concerning a virtual ACK in the second embodiment of the present invention.
Figure 11:
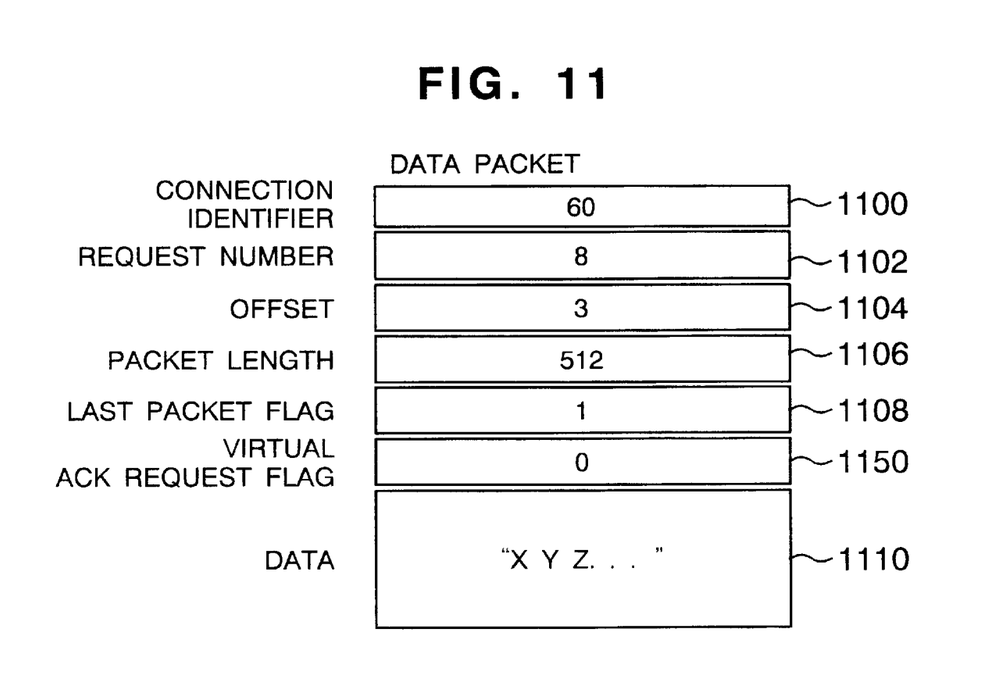
FIG. 11 is a diagram showing a data packet format in the second embodiment of the present invention.
Figure 12:
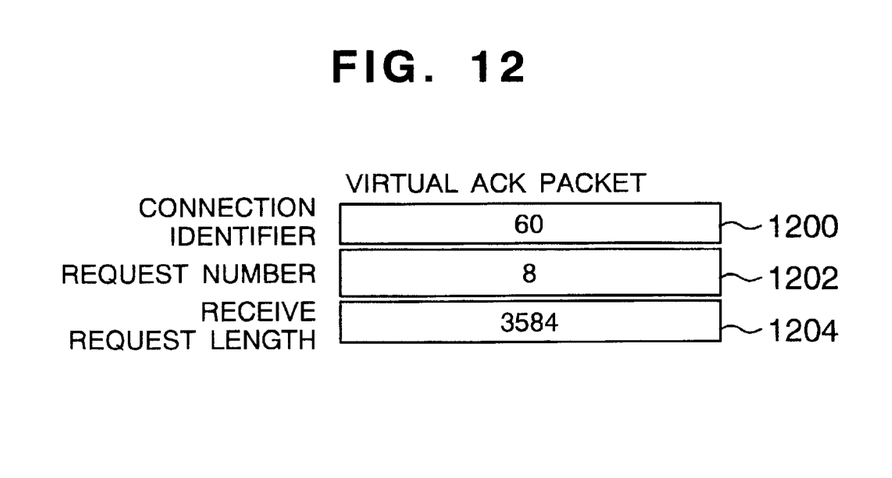
FIG. 12 is a diagram showing a virtual ACK packet format in the second embodiment of the present invention.

FIG. 9 is a flow chart showing the second embodiment and FIG. 10 shows the flow of transmission/reception processing indicative of the processing flow concerning a virtual ACK extracted from FIG. 9. FIGS. 5, 11 and 12 show a data structure for storing transmit/receive requests in the intermediate layer protocol module, a data packet format and a receipt acknowledgement packet format, respectively.

As in the first embodiment, FIG. 5 shows a connection data structure. In the case of synchronous transmission/reception, however, only one or fewer transmit requests during transmission and only one or fewer data waiting receive request can exist concurrently in the respective transmission/reception queues.

FIG. 11 shows addition of a virtual ACK request flag 1150 to the data packet format of FIG. 6. The virtual ACK request flag is a flag which is set when that data packet makes a request for a virtual ACK to the receiving side and specifically, it normally takes a value of either 0 or 1.

FIG. 12 shows a format of a virtual ACK packet transferred between the intermediate layer protocol modules 404 and 464 in FIG. 4. A connection identifier 1200 is a data structure assigned to each connection when the connection is established in either or both of the intermediate layer protocol modules 404, 464, and a request number 1202 indicates which transmit request this virtual ACK packet responds to. A receive request length 1204 indicates a receiving data length designated in a receive request. When the receive request length is shorter than the transmit request length, the transmitting side can inform to the application or upper layer protocol modules 402 and 462 an actually transmitted data length upon completion of the transmit request by using the receive request length 1204.

A concrete example of the virtual ACK packet format of FIG. 12 will now be described. Like a port number in the TCP and UDP, the connection identifier 1200 is assigned with a number, for example, 60. The request number 1202 is a request number of paired transmission and receive requests in which reception of a not-copying portion in the transmission buffer is confirmed by the virtual ACK packet and is assigned with a value such as 8. The receive request length 1204 is a receiving data length designated in the receive request and is designated by a value such as 3584 bytes.

Next, the operation of the construction added in the case of synchronous transmission/reception will be described on the basis of the flow chart of FIG. 9 and the diagram of FIG. 10 showing the processing flow.

Firstly, in step 1020, a transmit request 1 is issued from the application or upper layer protocol module 402 or 462 on the transmitting side to the intermediate layer protocol module 404 or 464. The former half (a not copying portion) of a transmission buffer in the transmit request 1 is divided into maximum transfer lengths which in turn are transmitted sequentially. In step 1022, in order for a final packet of the not copying portion to be transmitted, the virtual ACK request flag 1150 in FIG. 11 is set. Concurrently therewith, in step 1024, the latter half of the transmission buffer is copied on the buffer in the intermediate layer protocol module and the subsequent transmission is effected using the buffer in this intermediate layer protocol module. In the case where the receiving side receives a packet set with a virtual ACK request flag, it is examined whether or not all packets preceding that packet have already been received and if received, the virtual ACK packet is returned to the transmitting side as shown at step 1026. At that time, a reception length designated by the receive request is set in the receive request length 1204 of the virtual ACK packet. This process corresponds to steps 980 and 982 in the flow chart of FIG. 9. When the transmitting side receives this virtual ACK packet, it is known that all of the not copying portions have already been received and therefore, the buffer transferred from the upper layer protocol module becomes unnecessary. Then, in step 1028, a transmission end is notified to the application or upper layer protocol module 404 or 464. At that time, if the receive request length 1204 designated in the virtual ACK packet is smaller than the transmit request length, this receive request length 1204 is considered to be an actually transmitted/received data length and is notified concurrently. This process corresponds to steps 970 and 972 in the flow chart of FIG. 9. In step 1030, the application or upper protocol module 404 or 464 issues, in this phase, the next transmit request 2 to the intermediate layer protocol module 404 or 464. In step 1052, the buffer in the intermediate layer protocol module on the transmitting side is released when an ACK packet for the corresponding transmit request is received.

In this manner, in the case of synchronous transmission/reception, the next transmit request can be effected without waiting for the ACK by copying only the latter half of the transmission buffer, thereby ensuring that high-speed highly efficient data transmission/reception can be carried out by reducing the use rate of the CPU.

The processing flow described above will be further explained by using a concrete example. In the present example, the processing flow will be described in connection with data transmission/reception between paired transmission and receive requests having a request number of 8.

Firstly, the transmitting side transmits data of 3584 bytes. On the assumption that the maximum transfer unit (MTU) is 1024 bytes, the data transferred during the transmit request is larger than the maximum transfer length and so it is divided into four packets which in turn are transmitted sequentially. A data packet of FIG. 11 shows the fourth data packet transmitted at that time. In connection with the first, second and third data packets, the packet length is 1024 bytes and the last packet flag is 0. Since the fourth data packet is a final packet, it has a packet length of 512 bytes (which is the remainder of the packet length) and has a last packet flag which is 1. The fields of connection identifier and request number take the same value for all of the four data packets. Because of the fourth packet, the offset is 3. If the first and second data packets are not copied but for the third and fourth data packets, data copied on the buffer in the intermediate layer protocol module is transmitted, then a virtual ACK request flag in the second data packet will be rendered to be 1.

Next, it is assumed that the receiving side also performs a receive request of a receive request length of 3584 bytes. The data packet transmitted from the transmitting side identifies the receive request by the aid of the connection identifier being 60 in the data packet header and the request number being 8 on the connection, and is copied at a suitable position of the buffer for receiving data in the receive request in accordance with the offset and packet length. For example, the fourth data packet shown in FIG. 6 has an offset of 3 and is therefore copied on a position of 512 bytes from the 3072-nd byte on the buffer for receiving data. Upon reception of the second data packet, the virtual Ack request flag is 1 and therefore, reception of 0-th data packet is confirmed and a virtual ACK packet is transmitted to the transmitting side. The ACK packet of FIG. 12 shows a virtual ACK packet transmitted to the transmitting side at that time.

The transmitting side informs a transmission end to the application or upper layer protocol module at the time that it receives the virtual ACK packet from the receiving side. At that time, the application or upper layer protocol module is allowed to issue the next transmit request.

When receiving all data pieces, the receiving side transmits a receipt acknowledgement packet to the transmitting side. At the time that reception of all data pieces is completed, the receiving side is allowed to end the processing. Then, the transmitting side is allowed to release the buffer in the intermediate layer protocol module at the time that the receipt acknowledgement packet is received.

Advantageously, in the second embodiment, by copying only the latter half of the transmission buffer in the case of synchronous transmission/reception, the waiting time concomitant with ACK waiting which is inevitable in the case of synchronous transmission devoid of copying can be reduced and high-speed highly efficient data transmission/reception can be ensured by reducing the use rate of the CPU.

As in the case of the first embodiment, reliable transmission/reception can be warranted for data of a smaller request data length between paired transmission and receive requests of different request data lengths in the second embodiment, too.

As described above, according to the present invention, by controlling the transmission/reception between paired transmission and receive requests, any vain ACK in the case of copying on the transmitting side can be omitted and the transmission/reception can be ended regardless of the order of request during asynchronous transmission/reception, so that high-speed highly efficient data transmission/reception can be ensured by reducing the use rate of the CPU.

Further, in the case where the request data length differs for paired transmission and receive requests, reliable transmission/reception can be warranted for a smaller request data length, and therefore, a transmit request whose data length is unknown in advance can be dealt with by making a receive request with a predictive maximum transmit request data length.

Further, by precedently defining a format of transmit/receive request in which data pieces of higher importance are arranged closer to the head, causing the receiving side to determine which data of which priority is acquired by adjusting the receive request length and causing the transmitting side to determine which data of which priority is transmitted by adjusting the transmit request length, transmission/reception of data in accordance of with the priority can be ensured without determining a data length transmitted/received between the transmitting and receiving sides in advance. Through this, for example, the transmitting side can afford to change the transmission length in accordance with loads on the CPU and the network and the receiving side can afford to change the reception length in compliance with needs of a receiver, thus permitting suitability to image data transmission/reception and database retrieval.

Further, in the synchronous transmission/reception, the waiting time concomitant with ACK waiting which is inevitable in the case of synchronous transmission devoid of copying can be reduced by copying only the latter half of the transmission buffer, and high-speed highly efficient data transmission/reception can be ensured by reducing the use rate of the CPU.

We claim:

1. A communication method for use in a communication system which has a transmitting terminal, a receiving terminal and a network for connecting said transmitting and receiving terminals and in which a virtual circuit is established between said transmitting terminal and said receiving terminal, said transmitting terminal issues a transmit request on said virtual circuit, and said receiving terminal issues a receive request on said virtual circuit, comprising the steps of:

assigning identifiers to said receive request and said transmit request;

attaching said identifiers to said receive request and said transmit request, for mating said receive request with said transmit request;

mating said receive request with said transmit request using said identifiers; and performing transfer of said data from said transmitting terminal to said receiving terminal in accordance with said mating step.

2. A communication method according to claim 1, wherein the identifier attached to the transmit request is also attached to said receive request mated therewith.

3. A communication method according to claim 1, wherein the identifier attached to the receive request is also attached to said transmit request mated therewith.

4. A communication method according to claim 1, wherein a receiving side has, in respect of each receive request, a data structure indicating which portion of each receive request is received, decides the end of data reception between paired requests having a common request number by using a data structure of the data, and returns a receipt acknowledgment (ACK) upon completion of the reception.

5. A communication method according to claim 1, wherein when before the receive request is made, data due to the mating transmit request arrives, the data is discarded, and the arrival of the data is memorized; and when the receive request is actually carried out thereafter, a negative acknowledgment (NAK) is returned to the transmitting side to perform immediate re-transmission of the data.

6. A communication method according to claim 1, wherein a field indicating a final packet in a request is provided in a transmitting packet, and when a request data length of the transmit request is smaller than a request data length of the mating receive request, the end of the transmit request data is informed to a receiving side by using said field.

7. A communication method according to claim 6, wherein the transmit request data length is informed to a transmit request originator and a receive request originator when transmission/reception ends.

8. A communication method according to claim 1, wherein when a request data length of the transmit request is longer than a request data length of the mating receive request, reliable communication for data having the receive request data length is performed.

9. A communication method according to claim 8, wherein a field in which an actually received data length is accommodated is provided in a receipt acknowledgment, and a receive request data length is informed to a transmit request originator and a receive request originator upon completion of the transmission/reception by informing an actually transmitted data length to a transmitting side by using said field.

10. A communication method according to claim 1, wherein in the case of synchronous transmission/reception, data at a latter half of a transmission buffer in the transmit request is copied on a buffer on said transmitting terminal, a field indicating that a virtual ACK request is made is provided in a transmitting packet, and said field is set when a final packet of a not copying portion is transmitted, whereby a receiving side returns the virtual ACK if, at the time that the packet set with the field indicating that the virtual ACK request is made is received, all packets preceding said packet have already been received, and a transmitting side is allowed to make a next transmit request to said virtual circuit when said virtual ACK is received and releases a buffer for copy data hold on said transmitting terminal upon receipt of the ACK.

11. A communication method according to claim 10, wherein a field in which a data length designated in the receive request is accommodated is provided in the virtual ACK, and a receive request data length is informed to a transmit request originator and a receive request originator by informing an actually transmitted/received data length to a transmitting side by using said field.

12. A method for communication by a transmitting terminal for use in a communication system which has the transmitting terminal, a receiving terminal and a network for connecting said transmitting and receiving terminals and in which a virtual circuit is established between said transmitting terminal and said receiving terminal, said transmitting terminal issues a transmit request on said virtual circuit and said receiving terminal issues a receive request on said virtual circuit, comprising the steps of:

assigning an identifier to said transmit request;

attaching said identifier to said transmit request for mating said receive request with said transmit request;

mating said receive request with said transmit request using said identifier; and delivering said data to said receiving terminal in accordance with said mating.

13. A method for communication by a receiving terminal for use in a communication system which has a transmitting terminal, the receiving terminal and a network for connecting said transmitting and receiving terminals and in which a virtual circuit is established between said transmitting terminal and said receiving terminal, said transmitting terminal issues a transmit request on said virtual circuit and said receiving terminal issues a receive request on said virtual circuit, comprising the steps of:

assigning an identifier to said transmit request;

attaching said identifier to said receive request for mating said receive request with said transmit request;

mating said receive request with said transmit request using said identifier; and receiving said data transmitted from said transmitting terminal in accordance with said mating.

14. A memory medium storing a communication program of a transmitting terminal for use in a communication system which has the transmitting terminal, a receiving terminal and a network for connecting said transmitting and receiving terminals, and in which a virtual circuit is established between said transmitting terminal and said receiving terminal, said transmitting terminal issues a transmit request to said virtual circuit and said receiving terminal issues a receive request on said virtual circuit, wherein in said communication program, an identifier is assigned to said transmit request for mating said receive request with said transmit request, and said identifier is attached to said transmit request to mate said receive request with said transmit request and to deliver said data to said receiving terminal in accordance with the mating.

15. A memory medium storing a communication program of a receiving terminal for use in a communication system which has a transmitting terminal, the receiving terminal and a network for connecting said transmitting and receiving terminals, and in which a virtual circuit is established between said transmitting terminal and said receiving terminal, said transmitting terminal issues a transmit request on said virtual circuit and said receiving terminal issues a receive request on said virtual circuit, wherein in said communication program, an identifier is assigned to said transmit request for mating said receive request with said transmit request, and said identifier is attached to said receive request to mate said receive request with said transmit request and to receive said data transmitted from said transmitting terminal in accordance with the mating.

* * * * *